James A. Kline
INVENTOR.

BY
ATTORNEY
AGENT

United States Patent Office 3,118,348
Patented Jan. 21, 1964

3,118,348
FLUID PRESSURE ACTUATOR APPARATUS
James A. Kline, San Diego, Calif., assignor to General Dynamics Corporation, San Diego, Calif., a corporation of Delaware
Filed Feb. 7, 1963, Ser. No. 256,947
12 Claims. (Cl. 91—25)

This invention relates to fluid pressure actuator apparatus, and more particularly to a fluid pressure operated actuator capable of providing periodic reciprocation of a thrust member.

One use for which this invention is particularly adapted is in the copper smelting industry. In this industry, cylindrical converters are utilized wherein copper matte, which is a molten sulfide compound, is reduced to metallic copper. The reduction process is accomplished by blowing compressed air through the molten matte. The air enters the converters through tuyere pipes located below the level of the molten material. During admission of the air, a plug of porous, semi-solid material forms at the inner openings of the tuyere pipes. This plug creates severe restriction to flow of air as it progressively becomes thicker. In some instances, it is conventional practice in the smelting industry to employ men who manually remove this restricting plug by swinging steel bars through entry valves in the tuyeres to break up the plug. This operation is performed at frequent intervals during the blowing period. The work is hot, physically demanding, and subject to process control variation depending upon the efficiency of the men employed. In some instances, pneumatic devices have been developed to accomplish this work but have certain disadvantages. These include high maintenance cost, high initial cost, and problems generated by their operating characteristics. Certain of the prior pneumatic devices have depended upon external valving of the driving gas to accomplish return of the thrust member subsequent to the striking of the necessary blow. Because of the use of external valving, the thrust members of these devices have had a tendency to dwell momentarily at the extreme stroke position, thus allowing the thrust member ends to remain in contact with the very hot environment at the inner portion of the tuyere pipes for an excessive length of time. This has resulted in considerably more damage to the impact end of the thrust member than is experienced when a man smoothly swings and immediately returns the striker bar.

The present invention eliminates the disadvantages of prior devices where periodic reciprocation of a thrust member is desired, and provides an actuator which comprises a piston having a thrust portion and is adapted for cooperation with a wall to provide a pressure seal therebetween about a portion of the wall. A set force is applied to the piston to urge the piston toward the wall to establish the pressure seal. An actuating pressure is applied to the piston to overbalance the set force to eliminate the pressure seal and expose an increased piston surface area to the actuating pressure to move the piston from the wall to develop thrust in the piston thrust portion. The piston has a cavity which confronts an opening in the wall to atmosphere. A tube, which has one end positioned in the wall opening and the other end extending into the piston cavity, is provided with a first set of ports which release a portion of the actuating pressure to atmosphere through the tube after predetermined movement of the piston. Release of the actuating pressure to atmosphere serves to effect quick return movement of the piston without dwell toward the wall to re-establish the pressure seal. Unbalancing of the set force can be accomplished by utilizing a separate triggering force to cooperate with the actuating pressure on the piston. A second set of ports, which are located in the tube intermediate the first set of ports, serve to relieve any pressure trapped within the re-established pressure seal to atmosphere to prevent any premature operation of the actuator.

It is therefore an object of the present invention to provide a novel actuator capable of producing periodic reciprocation of a thrust member.

An object of the invention is to produce a device of this character which is economical to manufacture and maintain.

It is an object of this invention to provide a device of this character which may be manually or automatically operated.

A further object of the invention is to provide a novel actuator which quickly returns the thrust member after its forward stroke, thus eliminating dwell of the thrust member.

Other objects and advantages of the present invention will become apparent to those skilled in the art from a consideration of the following description, claims and accompanying drawings, wherein:

Figures 1, 2, 3:
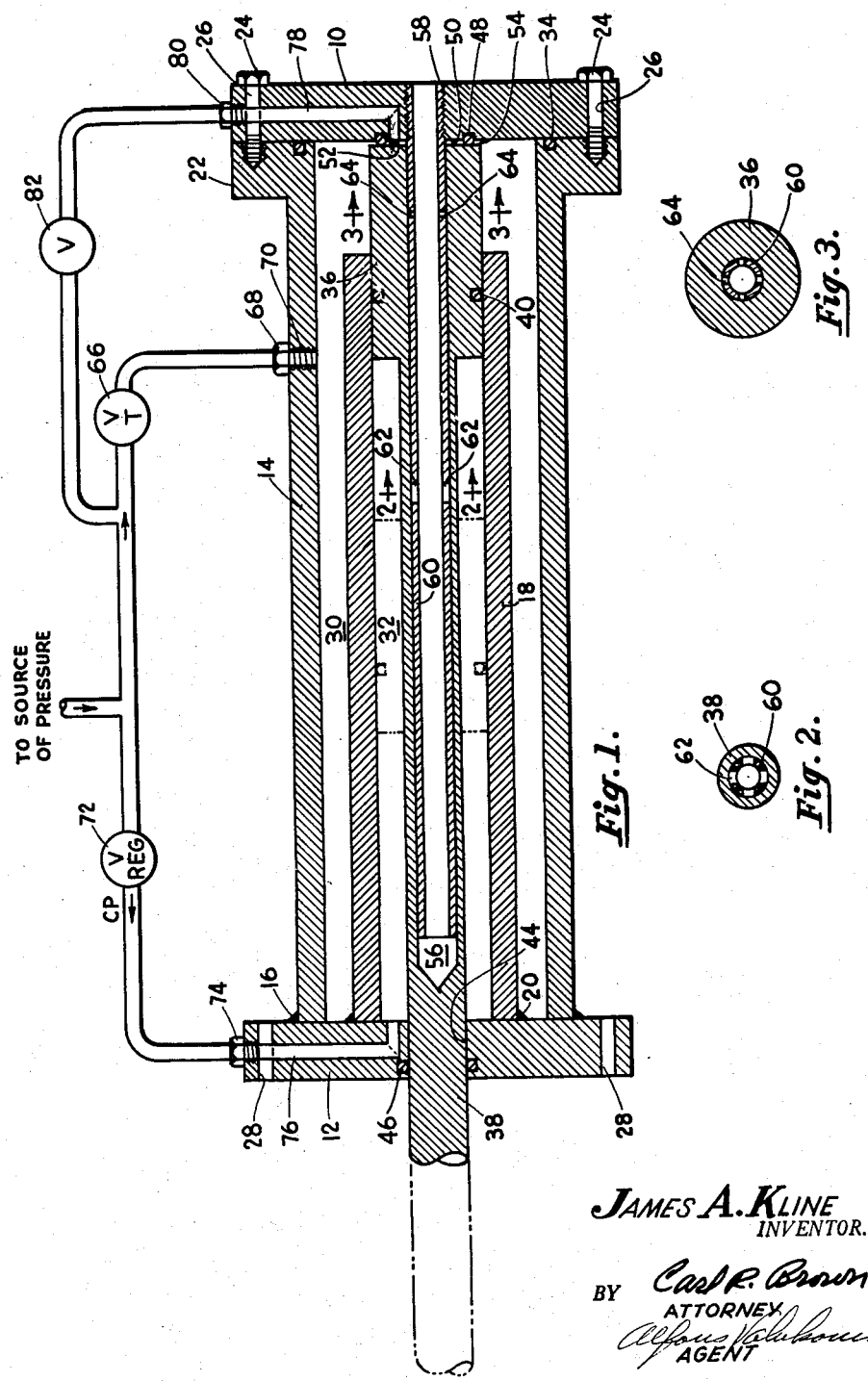
FIGURE 1 is an elevational sectional view of the actuator of the present invention.
FIGURE 2 is a sectional view taken at line 2—2 of FIGURE 1.
FIGURE 3 is a sectional view taken at line 3—3 of FIGURE 1.

Referring to the drawings, and particularly to FIGURES 1, 2 and 3, there is shown the actuator of the present invention. The actuator includes a housing assembly formed by a wall member 10, an end member 12, an outer cylindrical member 14 having one end secured to the end member 12 as by welding at 16, and inner cylindrical member 18 also secured at one end to the end member by welding 20. The wall member 10 is secured to a flanged end 22 of the outer cylindrical member as by bolts 24 extending through appropriate openings 26 in the wall member. The assembly can be secured, for example, to the tuyeres of copper smelters (not shown) or to any other mounting member, depending on the desired use of the actuator, as by appropriate bolts inserted through openings 28 in the end member 12. The housing is separated into an outer actuating pressure chamber 30 and an inner coaxial set pressure chamber 32 by the inner cylindrical member 18. Pressure sealing is provided for between the wall member 10 and the cylindrical member 14 by a resilient ring member 34 positioned in an appropriate groove in the flanged end 22.

A piston 36 having a thrust portion 38 is slidable in the inner cylindrical member 18 and confronts the wall member 10. An annular seal ring 40 in a peripheral groove in the piston provides pressure sealing between the cylinder 18 and the piston. The thrust portion 38 extends through an axial opening 44 in the end member 12. A resilient ring 46 in an appropriate groove within the opening 44 provides pressure sealing about the piston thrust portion.

A resilient annular sealing element 48 is secured as by bonding in an annular groove in the wall member 10 and extends from the wall member to contact the piston 36. The resilient sealing element 48 cooperates with the piston to effect a circular pressure seal between the piston and the wall member about a surface portion 50 of the wall member and about a surface area 52 of the piston 36. The sealing element 48 defines an annular surface area 54 radially outside the pressure seal.

An axial cavity 56 is provided in the piston 36 and thrust portion 38 which is confronted by an opening 58 in the wall member 10. A tube 60 has one end positioned in the opening 58 as by threaded engagement and the other end extended into the cavity 56. The tube has a first set of ports 62, as better shown in FIGURE 2, and a second set of ports 64, as shown in FIGURE 3, for a purpose hereinafter described.

The chamber 30 is supplied with actuating pressure from a source of pressure (not shown) through suitable piping, a throttle valve 66 and a fluid coupling 68 in a port 70. Suitable piping from the source of pressure, a regulator valve 72, and a fluid coupling 74 in a passage 76 in the end member 12 provides means for introducing a set pressure in chamber 32. A passage 78 in the wall member 10, a fluid coupling 80, a manually operable valve 82 and suitable piping connected to the source of pressure serve to provide a triggering pressure to the actuator.

To operate the actuator, a set pressure is introduced into the set pressure chamber 32 through the regulator valve 72, coupling 74 and passage 76. The set pressure, which is established at a relatively low value by the regulator valve 72, act supon the effective cross-sectional area of the piston 36 defined within the seal 40. A set force is thereby exerted which urges the piston against the wall member 10 and compresses the resilient sealing element 48 against the piston to effect a positive pressure seal about the portion 50 of the wall member 10. A relatively high actuating pressure is established in the actuating pressure chamber 30 through the throttle valve 66, coupling 68 and port 70. The throttle valve 66 serves to regulate admission of actuating pressure into the chamber 30 to control the rate of cycling of the actuator. As the actuating pressure is admitted to chamber 30, it acts on the annular piston surface area 54 radially outside the pressure seal. The force of this pressure on the annular area 54 opposes the set force on the piston. When the actuating pressure reaches a value such that the set force is overbalanced, the piston 36 is unseated and the sealing element 48 disengaged from the piston. With the pressure seal thus eliminated, the high actuating pressure is released substantially instantaneously upon the piston surface area 52 within the pressure seal. The piston 36 is suddenly impelled with great force from the wall member 10 to produce thrust in the piston thrust portion 38.

The overbalancing of the piston 36 could be done at will by utilizing a separate triggering force to cooperate with the actuating pressure force on the piston surface area 54 outside the pressure seal in overbalancing the set force. This triggering force may be applied mechanically to the piston thrust portion 38. It is preferably applied by actuating the manually operable valve 82 to introduce a triggering pressure from the pressure source through the coupling 80 and passage 78 to the piston area 52 within the sealing element 48. The triggering pressure cooperates with the force of the actuating pressure on the piston area 54 outside the pressure seal such that the set force is overbalanced thus eliminating the pressure seal and suddenly releasing the actuating pressure upon the surface area 52, as hereinbefore set forth.

Deceleration and rapid return of the piston 36 toward the wall member 10 to re-establish the pressure seal is accomplished by compression of the pressure fluid in chamber 32 by the piston and a release of a portion of the actuating pressure in chamber 30 through the ports 62 and tube 60 to atmosphere.

Upon the re-establishing of the pressure seal between the piston 36 and the wall member 10 the trapping of pressure within the seal 48 is prevented by relieving the pressure past the tube 60 and through the ports 64 to atmosphere. Pressure trapped within the seal would act on the piston 36 to oppose the set force on the piston. A relatively low pressure in the actuating pressure chamber 30 would then effect movement of the piston from the wall 10 thus causing premature elimination of the pressure seal and operation of the actuator.

After the piston 36 is reseated against the wall member 10, the actuator is ready for repeat operation, as hereinbefore described.

From the foregoing description, those skilled in the art will appreciate that the present invention achieves the objects and realizes the mentioned advantages.

Although a specific embodiment of the present invention has been illustrated and described herein, it will be understood that the same is merely exemplary, and that the invention is not limited thereto since numerous variations will be readily apparent to those versed in the art, and the invention is entitled to the broadest interpretation within the terms of the appended claims.

What I claim is:

1. An actuator comprising means defining a wall, a piston having a thrust portion and adapted for cooperation with the wall to provide a pressure seal therebetween about a surface portion of the wall, means for applying a set force urging the piston toward the wall to establish said pressure seal, means for applying an actuating pressure on said piston to overbalance said set force to eliminate the pressure seal and expose an increased piston surface area to the actuating pressure to move the piston from the wall to develop thrust in the piston thrust portion, said piston having a cavity, said wall having an opening therethrough to atmosphere, a tube having one end positioned in the opening and the other end extending into said cavity, and means for releasing a portion of the actuating pressure through the tube to atmosphere after predetermined movement of the piston to effect return movement of the piston toward the wall to re-establish said pressure seal.

2. An actuator comprising means defining a wall, a piston having a thrust portion and adapted for cooperation with the wall to provide a pressure seal therebetween about a surface portion of the wall, means for exerting a set force urging the piston toward the wall to effect said pressure seal, means for applying an actuating pressure to the piston to exert a second force opposing said set force, and means for applying a triggering force to the piston to cooperate with said second force in overbalancing the set force to eliminate the pressure seal and expose an increased piston surface area to the actuating pressure to rapidly move the piston from the wall to develop thrust in the piston thrust portion, said wall having an opening therethrough to atmosphere, a tube having one end positioned in the opening and the other end extending into said cavity, and means for releasing a portion of the actuating pressure through the tube to atmosphere after predetermined movement of the piston to effect return movement of the piston toward the wall to re-establish said pressure seal.

3. An actuator comprising means defining a wall, a piston having a thrust portion and adapted for cooperation with the wall to provide a pressure seal therebetween about a surface portion of the wall, means for applying a set force urging the piston toward the wall to establish said pressure seal, means for applying an actuating pressure on said piston to overbalance said set force to eliminate the pressure seal and expose an increased piston surface area to the actuating pressure to move the piston from the wall to develop thrust in the piston thrust portion, said piston having a cavity, said wall having an opening therethrough to atmosphere confronting said cavity, a tube having one end positioned in the opening and the other end extending into said cavity, said tube having ports for releasing a portion of the actuating pressure to atmosphere after predetermined movement of the piston to effect return movement of the piston toward the wall to re-establish said pressure seal.

4. An actuator comprising means defining a wall, a piston confronting the wall and having a thrust portion, sealing means disposed between the piston and the wall for effecting a pressure seal therebetween about a surface portion of the wall, means for applying a set pressure to the piston to exert a set force urging the piston toward the wall to effect said pressure seal, said pressure seal separating a first piston surface area outside the pressure seal and a second piston surface area within the pressure seal, means for applying an actuating pressure to act upon said first piston surface area to overbalance said set force to eliminate the pressure seal and release the actuating pressure upon said second piston surface area to move the piston from the wall to develop thrust in the piston thrust portion, said piston having a cavity surrounded by said second piston surface area, said wall surface portion having an opening therethrough to atmosphere confronting said cavity, a tube having one end positioned in the opening and the other end extending into said cavity, said tube having ports for releasing a portion of the actuating pressure to atmosphere after predetermined movement of the piston to effect return movement of the piston toward the wall to re-establish said pressure seal.

5. An actuator comprising means defining a wall, a piston confronting the wall and having a thrust portion, sealing means disposed between the piston and the wall for effecting a pressure seal therebetween about a surface portion of the wall, means for applying a set pressure to the piston to exert a set force urging the piston toward the wall to effect said pressure seal, said pressure seal separating a first piston surface area outside the pressure seal and a second piston surface area within the pressure seal, means for applying an actuating pressure upon said first piston surface area outside the seal to exert a second force opposing said set force, means for applying a triggering force to said second piston surface area to cooperate with said second force in overbalancing said set force to eliminate the pressure seal and expose said second piston surface area to the actuating pressure to move the piston from the wall to develop thrust in the piston thrust portion, said piston having a cavity surrounded by said second piston surface area, said wall surface portion having an opening therethrough to atmosphere confronting said cavity, a tube having one end positioned in the opening and the other end extending into said cavity, said tube having ports for releasing a portion of the actuating pressure to atmosphere after predetermined movement of the piston to effect return movement of the piston toward the wall to re-establish said pressure seal.

6. An actuator comprising means defining a wall, a piston confronting the wall and having a thrust portion, sealing means disposed between the piston and the wall for effecting a pressure seal therebetween about a surface portion of the wall, means for applying a set pressure to the piston to exert a set force urging the piston toward the wall to effect said pressure seal, said pressure seal separating a first piston surface area outside the pressure seal and a second piston surface area within the pressure seal, means for applying an actuating pressure upon said first piston surface area outside the seal to exert a second force opposing said set force, means for applying a triggering force to said second piston surface area to cooperate with said second force in overbalancing said set force to eliminate the pressure seal and expose said second piston surface area to the actuating pressure to move the piston from the wall to develop thrust in the piston thrust portion, said piston having a cavity surrounded by said second piston surface area, said wall surface portion having an opening therethrough to atmosphere confronting said cavity, a tube having one end positioned in the opening and the other end extending into said cavity, said tube havig a first set of ports for releasing a portion of the actuating pressure to atmosphere after predetermined movement of the piston to effect return movement of the piston toward the wall to re-establish said pressure seal and a second set of ports intermediate said first set of ports and the wall for relieving to atmosphere the actuating pressure trapped within the re-established pressure seal.

7. An actuator comprising housing means defining first and second pressure chambers, means defining a wall, a piston having a thrust portion extending from the housing means and cooperable with the wall to effect a pressure seal therebetween about a surface portion of the wall, means for establishing a set pressure in the first chamber to exert a set force urging the piston toward the wall to establish said pressure seal, means for establishing an actuating pressure in the second chamber to act upon said piston to overbalance said set force to eliminate the pressure seal and expose an increased piston surface area to the actuating pressure to move the piston from the wall to develop thrust in the piston thrust portion, said piston having a cavity, said wall having an opening therethrough to atmosphere confronting said cavity, a tube having one end positioned in the opening and the other end extending into said cavity, and means for releasing a portion of the actuating pressure through the tube to atmosphere after predetermined movement of the piston to effect return movement of the piston toward the wall to re-establish said pressure seal.

8. An actuator comprising housing means defining an inner first pressure chamber and an outer second pressure chamber within the housing means, means defining a wall at an end of the second chamber, a piston slidable in said first chamber and having a thrust portion extending from the housing means, said piston being cooperable with the wall to effect a pressure seal therebetween about a surface portion of the wall, means for establishing a set pressure in the first chamber to exert a set force urging the piston toward the wall to establish said pressure seal, means for establishing an actuating pressure in the second chamber to act upon said piston to overbalance said set force to eliminate the pressure seal and expose an increased piston surface area to the actuating pressure to move the piston from the wall to develop thrust in the piston thrust portion, said piston having a cavity, said wall having an opening therethrough to atmosphere confronting said cavity, a tube having one end positioned in the opening and the other end extending into said cavity, and means for releasing a portion of the actuating pressure through the tube to atmosphere after predetermined movement of the piston to effect return movement of the piston toward the wall to re-establish said pressure seal.

9. An actuator comprising housing means defining an inner first pressure chamber and a coaxial outer second pressure chamber within the housing means, means defining a wall at an end of the second chamber, a piston slidable in said first chamber and having a thrust portion extending from the housing means, said piston being cooperable with the wall to effect a pressure seal therebetween about a surface portion of the wall, means for establishing a set pressure in the first chamber to exert a set force urging the piston toward the wall to establish said pressure seal, means for establishing an actuating pressure in the second chamber to act upon said piston to overbalance said set force to eliminate the pressure seal and expose an increased piston surface area to the actuating pressure to move the piston from the wall to develop thrust in the piston thrust portion, said piston having a cavity, said wall having an opening therethrough to atmosphere confronting said cavity, a tube having one end positioned in the opening and the other end extending into said cavity, said tube having ports for releasing a portion of the actuating pressure to atmosphere after predetermined movement of the piston to effect return movement of the piston toward the wall to re-establish said pressure seal.

10. An actuator comprising housing means defining an inner first pressure chamber and a coaxial outer second pressure chamber within the housing means, means defining a wall at an end of the second chamber, a piston slidable in said first chamber and having a thrust portion extending from the housing means, a resilient annular sealing element positioned between the piston and the wall for effecting a pressure seal therebetween about a surface portion of the wall, means for establishing a set pressure in the first chamber to exert a set force urging the piston toward the wall to establish said pressure seal, said pressure seal separating a first piston surface area outside the pressure seal and a second piston surface area within the pressure seal, means for establishing an actuating pressure in the second chamber to act upon said first piston surface area outside the seal to overbalance said set force to eliminate the pressure seal and expose said second piston surface area to the actuating pressure to move the piston from the wall to develop thrust in the piston thrust portion, said piston having a cavity surrounded by said second piston surface area, said wall surface portion having an opening therethrough to atmosphere confronting said cavity, a tube having one end positioned in the opening and the other end extending into said cavity, said tube having ports for releasing a portion of the actuating pressure to atmosphere after predetermined movement of the piston to effect return movement of the piston toward the wall to re-establish said pressure seal.

11. An actuator comprising housing means defining an inner first pressure chamber and a coaxial outer second pressure chamber within the housing means, means defining a wall at an end of the second chamber, a piston slidable in said first chamber and having a thrust portion extending from the housing means, a resilient annular sealing element positioned between the piston and the wall for effecting a pressure seal therebetween about a surface portion of the wall, means for establishing a set pressure in the first chamber to exert a set force urging the piston toward the wall to establish said pressure seal, said pressure seal separating a first piston surface area outside the pressure seal and a second piston surface area within the pressure seal, means for establishing an actuating pressure in the second chamber to act upon said first piston surface area outside the seal to exert a second force opposing said set force, means for introducing a triggering pressure to said second piston surface area to cooperate with said second force in overbalancing said set force to eliminate the pressure seal and expose said second piston surface area to the actuating pressure to move the piston from the wall to develop thrust in the piston thrust portion, said piston having a cavity surrounded by said second piston surface area, said wall surface portion having an opening therethrough to atmosphere confronting said cavity, a tube having one end positioned in the opening and the other end extending into said cavity, said tube having ports for releasing a portion of the actuating pressure to atmosphere after predetermined movement of the piston to effect return movement of the piston toward the wall to re-establish said pressure seal.

12. An actuator comprising housing means defining an inner first pressure chamber and a coaxial outer second pressure chamber within the housing means, means defining a wall at an end of the second chamber, a piston slidable in said first chamber and having a thrust portion extending from the housing means, a resilient annular sealing element positioned between the piston and the wall for effecting a pressure seal therebetween about a surface portion of the wall, means for establishing a set pressure in the first chamber to exert a set force urging the piston toward the wall to establish said pressure seal, said pressure seal separating a first piston surface area outside the pressure seal and a second piston surface area within the pressure seal, means for establishing an actuating pressure in the second chamber to act upon said first piston surface area outside the seal to exert a second force opposing said set force, means for introducing a triggering pressure to said second piston surface area to cooperate with said second force in overbalancing said set force to eliminate the pressure seal and expose said second piston surface area to the actuating pressure to move the piston from the wall to develop thrust in the piston thrust portion, said piston having a cavity surrounded by said second piston surface area, said wall surface portion having an opening therethrough to atmosphere confronting said cavity, a tube having one end positioned in the opening and the other end extending into said cavity, said tube having a first set of ports for releasing a portion of the actuating pressure to atmosphere after predetermined movement of the piston to effect return movement of the piston toward the wall to re-establish said pressure seal and a second set of ports intermediate said first set of ports and the wall for relieving to atmosphere the actuating pressure trapped within the re-established pressure seal.

References Cited in the file of this patent
UNITED STATES PATENTS
3,093,117    Brown _____ June 11, 1963